United States Patent
Popovich et al.

(10) Patent No.: US 6,373,603 B1
(45) Date of Patent: Apr. 16, 2002

(54) IMAGE GENERATING SYSTEM INCLUDING COMPENSATION FOR CHROMATIC DISPERSION

(75) Inventors: Milan M. Popovich, Leicester (GB); Jonathan D. Waldern, Los Altos, CA (US)

(73) Assignee: DigiLens. Inc., Sunnyvale, CA (US)

( * ) Notice: Subject to any disclaimer, the term of this patent is extended or adjusted under 35 U.S.C. 154(b) by 0 days.

(21) Appl. No.: 09/593,721

(22) Filed: Jun. 13, 2000

Related U.S. Application Data

(60) Provisional application No. 60/139,325, filed on Jun. 14, 1999.

(51) Int. Cl.[7] ............... G02B 5/32; G02B 1/1334
(52) U.S. Cl. .............. 359/15; 359/4; 359/7; 349/201; 348/744
(58) Field of Search .................. 359/150, 18, 204, 359/3, 4, 7; 349/115, 135, 201; 348/744

(56) References Cited

U.S. PATENT DOCUMENTS

| 3,807,829 A | 4/1974 | Close ................... 350/3.5 |
| 4,759,596 A | 7/1988 | Po et al. .............. 350/96.15 |
| 4,830,441 A | 5/1989 | Chang ................... 350/3.7 |
| 5,014,709 A | 5/1991 | Bjelkhagen et al. .......... 128/654 |
| 5,063,379 A | 11/1991 | Fabry et al. ............. 340/784 |
| 5,093,563 A | 3/1992 | Small et al. ............. 250/201.9 |
| 5,103,323 A | 4/1992 | Magarinos et al. ............. 359/8 |
| 5,151,724 A | 9/1992 | Kikinis ................... 357/17 |
| 5,153,670 A | 10/1992 | Jannson et al. ............. 356/301 |
| 5,221,957 A | 6/1993 | Jannson et al. ............. 356/301 |
| 5,227,898 A | 7/1993 | Iavecchia et al. ............. 359/9 |
| 5,299,035 A | 3/1994 | Leith et al. ................ 359/9 |
| 5,365,354 A | 11/1994 | Jannson et al. ............. 359/15 |
| 5,418,631 A | 5/1995 | Tedesco ................... 359/15 |
| 5,471,327 A | 11/1995 | Tedesco et al. ............. 359/15 |
| 5,506,701 A | 4/1996 | Ichikawa ................. 359/15 |
| 5,530,565 A | 6/1996 | Owen .................... 359/15 |
| 5,535,024 A | 7/1996 | Khoury et al. ............. 359/7 |
| 5,537,232 A | 7/1996 | Biles .................... 359/15 |
| 5,539,544 A | 7/1996 | Le Paih et al. ............. 359/15 |
| 5,557,283 A | 9/1996 | Sheen et al. ............. 342/179 |
| 5,581,378 A | 12/1996 | Kulick et al. ............. 359/9 |
| 5,608,552 A | 3/1997 | Smith .................... 349/5 |
| 5,615,186 A | 3/1997 | Rosen et al. ............. 369/44.24 |
| 5,629,784 A | 5/1997 | Abileah et al. ............. 349/112 |
| 5,680,231 A | 10/1997 | Grinberg et al. ............. 359/15 |
| 5,701,132 A | * 12/1997 | Kollin et al. ............. 345/8 |
| 5,703,702 A | 12/1997 | Crane et al. ............. 359/1 |
| 5,721,598 A | 2/1998 | Smith ................... 349/106 |
| 5,721,630 A | 2/1998 | Horner et al. ............. 359/15 |
| 5,777,742 A | 7/1998 | Marron ................ 356/359 |
| 5,796,498 A | 8/1998 | French .................. 359/4 |
| 5,796,499 A | 8/1998 | Wenyon ................. 359/15 |
| 5,808,759 A | 9/1998 | Okamori et al. ............. 359/15 |
| 5,844,709 A | 12/1998 | Rabinovich et al. ......... 359/248 |
| 5,868,480 A | 2/1999 | Zeinali .................. 353/31 |
| 5,942,157 A | * 8/1999 | Sutherland et al. ......... 252/582 |
| 6,154,259 A | * 11/2000 | Hargis et al. ............. 359/599 |

* cited by examiner

Primary Examiner—Jon Henry
(74) Attorney, Agent, or Firm—Van Pelt & Yi LLP

(57) ABSTRACT

A system and method for generating a system are disclosed. The system includes a display device comprising a plurality of display regions, each region configured for displaying a color component of the image. A display controller is coupled to the display device and is operable to activate the regions of the display device to display portions of the image. A plurality of light directing devices are positioned to receive light from regions of the display device and direct light towards an image plane. The system further includes a light directing controller coupled to the light directing devices to direct light received thereby to different areas of the image plane. The areas of the image plane generally correspond to the different portions of the image displayed by the regions of the display device. The display controller and light directing controller are coupled together such that the light directing devices direct light to the area of the image plane corresponding to the portion of the image displayed by the region of the display device.

42 Claims, 7 Drawing Sheets

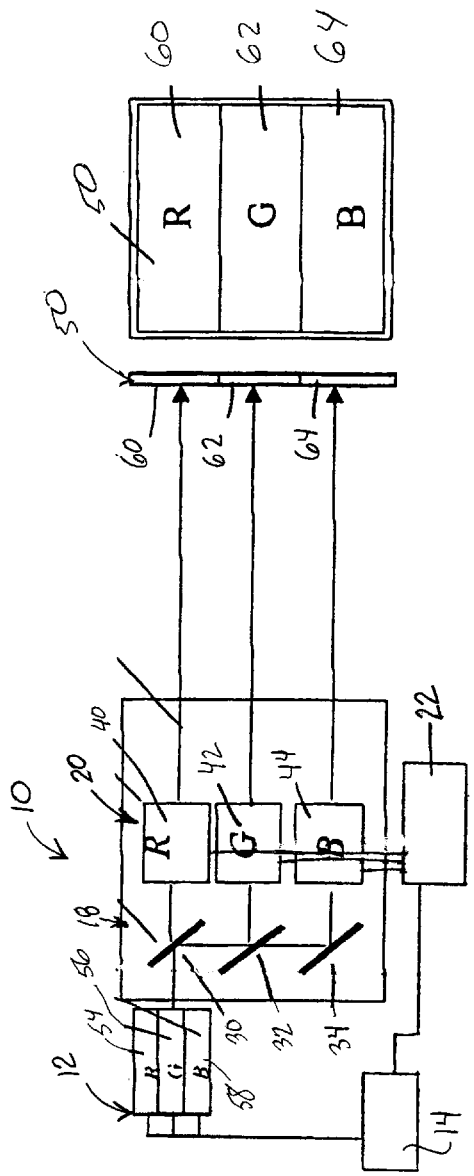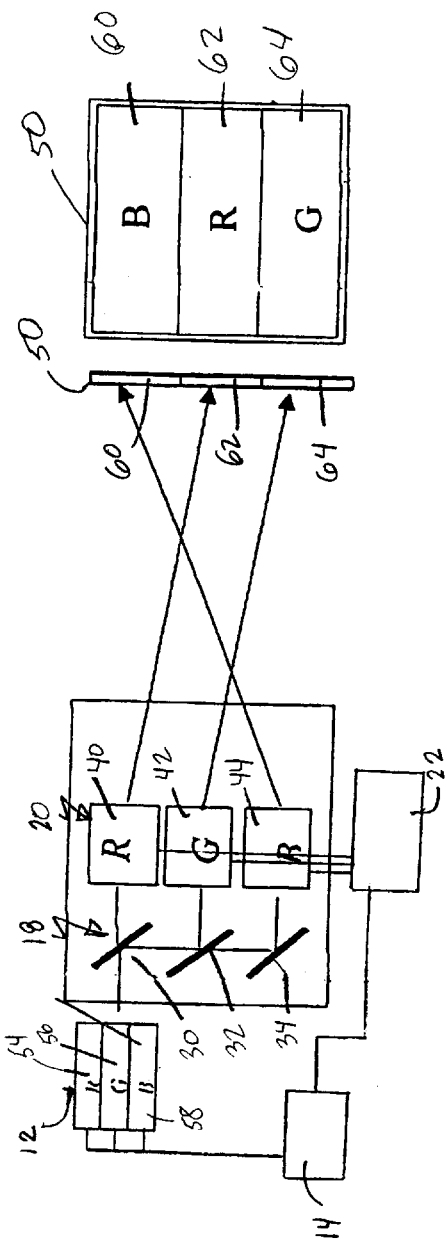

IMAGE GENERATING SYSTEM INCLUDING COMPENSATION FOR CHROMATIC DISPERSION

RELATED APPLICATIONS

The present application claims the benefit of U.S. Provisional Application Ser. No. 60/139,325, filed Jun. 14, 1999.

BACKGROUND OF THE INVENTION

The present invention relates generally to image generating systems, and more particularly, to an image generating system employing electrically switchable holograms.

Certain image display systems typically include a display screen configured to display monochrome images. Current microdisplays are typical of display panels that are configured to display monochrome images. When a multi-color display is required, a sequence of images is displayed and illuminated sequentially with red, green, and blue lights. The switching from one image to the next is performed rapidly (e.g., at a rate faster than the response time of a human eye) so that a color image is created in the viewer's eye due to the integration of red, green, and blue monochrome images. This allows a viewer to see a full color image generated from a display system having a display screen operable to produce only monochrome images. The display system typically includes a white light source and a rotating color wheel having red, green, and blue filters to provide color sequential illumination of a display device. However, these rotating filters are often susceptible to mechanical failures and tend to be large and noisy.

Another category of displays is based on emissive technologies such as Light Emitting Diodes (LED), Light Emitting Polymers (LEP), Organic Light Emitting Diodes (OLED), electroluminescent displays and field—emission displays. In order to provide color it is necessary to have separate red, green and blue emitters. In such devices it is advantageous if the display screen is separated into distinct red, green, and blue regions, with each region containing emissive material and drive circuitry that can be optimized for a specific wavelength range. This offers significant cost savings in fabrication by avoiding the problems of depositing different materials in close proximity to form RGB (red-green-blue) groups (e.g., RGB triads) in order that a full color high resolution display can be provided. By grouping red, green and blue emitters in separate regions of the display it is possible to provide high resolution and brightness. However, there is the problem of how the separate monochrome images can be fused into a single full color image.

SUMMARY OF THE INVENTION

A system and method for generating an image are disclosed. A system of the present invention generally comprises a display device having a plurality of display regions, each region configured for displaying a color component of the images and a display controller coupled to the display device and operable to activate the regions of the display device to display different portions of the image. The system further includes a plurality of light directing devices positioned to receive light from the regions of the display device and direct light towards an image plane and a light directing controller coupled to the light directing devices to direct light received thereby to different areas of the image plane. The areas of the image plane generally correspond to the different portions of the image displayed by the regions of the display device. The display controller and the light directing controller are coupled together such that the light directing devices direct light to the area of the image plane corresponding to the portion of the image displayed by the region of the display device.

In another aspect of the invention, a system for creating a full polychromatic image from a plurality of monochromatic images containing a portion of the full images generally comprises a plurality of light directing devices. Each of the light directing devices comprises a plurality of holographic optical elements switchable between an active state wherein light incident on the element is transmitted without substantial alteration. The holographic optical elements are operable to receive the portion of the full image and direct it to an area of an image plane corresponding generally to the portion of the image received.

A method of the present invention for generating a polychromatic image generally comprises displaying a plurality of monochromatic images components on a display device. Each image component contains a different portion of a full image. The image components are received at a plurality of light directing devices. Each of the light directing devices is configured to diffract a different wavelength light. The image components are directed to areas of an image plane. generally corresponding to the portion of the image contained within the component.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

FIG. 1A is a schematic side view of a first embodiment of an image generating system of the present invention with images tiled on an intermediate image plane in a first sequence.

FIG. 1B is a front view of the intermediate image plane of FIG. 1A.

FIG. 2A is a schematic side view of the image generating system of FIG. 1A with images tiled on the intermediate image plane in a second sequence.

FIG. 2B is a front view of the intermediate image plane of FIG. 2A.

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 3B:
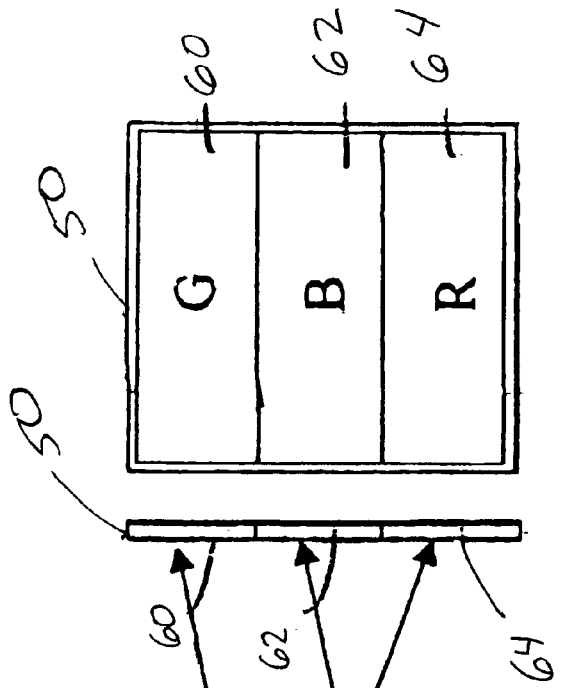
FIG. 3B is front view of the intermediate image plane of FIG. 3A.
Figure 3A:
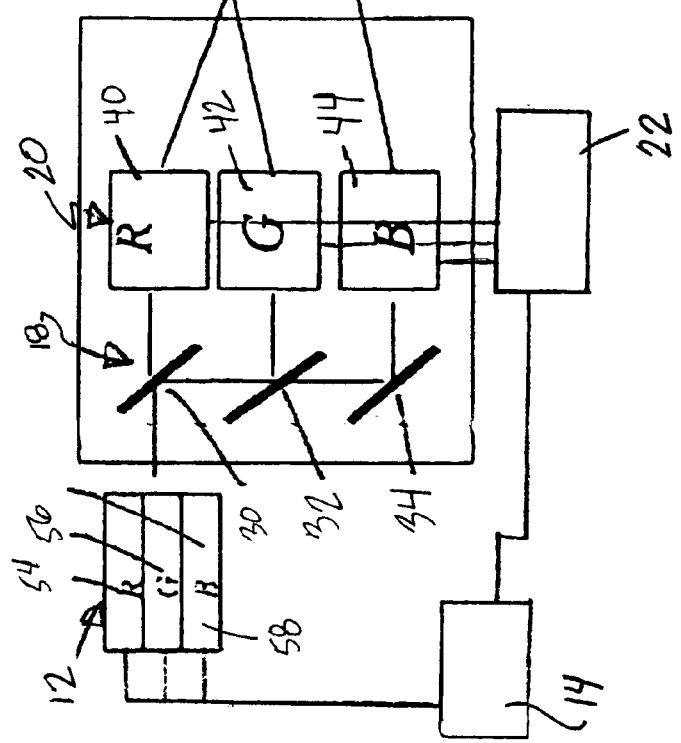
FIG. 3A is a schematic side view of the image generating system of FIG. 1A with images tiled on the intermediate image plane in a third sequence.
Figure 4A:
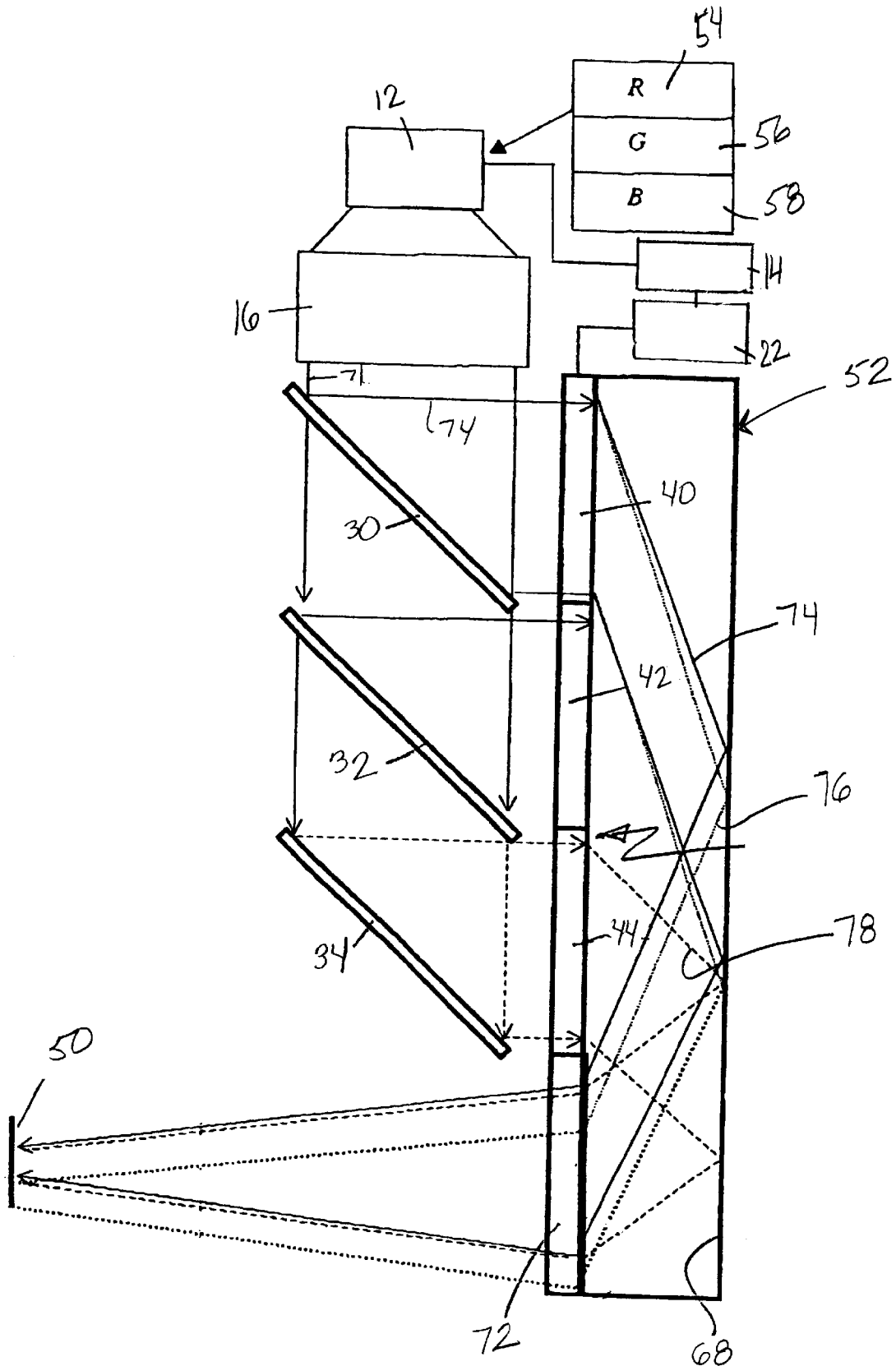
FIG. 4A is a side view of the image generating system of FIG. 1A illustrating additional detail.

Referring now to the drawings, and first to FIG. 1, a first embodiment of an image generating system of the present invention is shown and generally indicated at 10. The system includes a display device 12, display controller 14, collimation optics 16 (shown in FIG. 4A), filter system 18, light directing system 20, and a light directing system controller 22. Light emitted from the display device 12 is transmitted by the collimation optics 16 to the filter system 18. The filter system 18 comprises a plurality of filters 30, 32, 34 which filter light within a specific wavelength band and reflect the light onto one of the light directing devices 40, 42, 44 of the light directing system 20. The light directing devices 40, 42, 44 are preferably contained within a light guide 52, as shown in FIG. 4A. The light directing devices 40, 42, 44 direct light onto an intermediate image plane 50. As further described below, the display device 12 includes a plurality of regions 54, 56, 58, each operable to display a color component of an image. The light directing devices 40, 42, 44 direct light from respective regions 54, 56, 58 of the display device 12 to different areas 60, 62, 64 of the intermediate image plane 50 to display different color components of the image. Each of the images displayed by one of the regions 54, 56, 58 is a monochromatic image containing only a portion (e.g., upper third, middle third, or lower third) of the fall final image a user of the system will view.

The display controller 14 sequentially illuminates the regions 54, 56, 58 of the device 12 to display the respective color portions of the image in a cyclic fashion. Light directing controller 22 controls operation of the light directing devices 40, 42, 44 in synchronism with the display controller 14 so that each component of the image is directed towards its respective area on the image plane 50. For example, the light directing controller 22 controls the light directing devices 40, 42, 44 in synchronism with the display controller 14 such that an upper portion of the image is always directed towards upper area 60 of the image plane 50, a middle portion of the image is always directed towards middle area 62 of the image plane, and a lower portion of the image is always directed towards lower area 64 of the image plane. The switching between the image components is performed very rapidly, so that an observer perceives a full color image over substantially the entire intermediate image plane 50.

The light directing devices 40, 42, 44 are cycled through three stages (or sequences) as shown in FIGS. 1A, 1B, 2A, 2B, 3A and 3B. In a first stage (shown in FIGS. 1A and 1B) the red, green, and blue regions 54, 56, 58 of the display device 12 display the upper, middle, and lower portions of the image. Light from each of these regions 54, 56, 58 is directed to the corresponding upper, middle, and lower regions 60, 62, 64, respectively, of the image plane 50. In a second stage (shown in FIGS. 2A and 2B) the red region 54 of the display device 12 displays the middle portion of the image and light from the red component is directed to the middle area 62 of the image plane 50. The green region 56 of the display device 12 displays the lower portion of the image and the green component is directed to the lower area 64 of the image plane 50. The blue region 58 of the display device 12 displays the upper portion of the image and light is directed to the upper area 60 of the image plane 50. In the last stage (shown in FIGS. 3A and 3B) the red region 54 of the display device 12 displays the lower portion of the image, the green region 56 displays the upper portion of the image, and the blue region 58 displays the middle portion of the image. The red component of the image is now directed to the lower portion 64 of the image plane 50, the green image component is directed towards the upper portion 60 of the image plane, and the blue component is directed towards the middle portion 62 of the image plane. This cycle is then repeated for the next frame to display a video image. The image plane 50 thus receives in succession red, blue, and green components of the upper portion of the image. Similarly, the middle area 62 of the image plane 50 receives in succession green, red, and blue components of the middle portion of the image, and the lower area 64 of the image plane receives in succession blue, green, and red components of the lower portion of the image. The switching between the image components occurs very rapidly so that an observer perceives what is effectively a full color image over substantially the entire image plane 50.

The display device 12 includes a display surface typically comprising an array of pixels for displaying monochromatic data or monochromatic images in accordance with signals generated by an image control circuit (display controller) 14. The display device 12 may include a plurality of light emitting elements such as light emitting diodes (LED) arranged in an array. The light emitting elements within each region 54, 56, 58 are controlled by the display controller 14 such that each region displays a different color component of the final image. The first region 54 of the display 12 comprises an array of red light emitting elements, the second region 56 comprises an array of green light emitting elements, and the third region 58 comprises an array of blue light emitting elements. The resolution of each of the arrays is preferably substantially identical. Also, the arrays are preferably the same size covering, for example, one third of the display surface. The arrays are shown to form horizontal bands across the display surface, however, the arrays may be formed in different patterns, without departing from the scope of the invention. The regions 60, 62, 64 of the image plane 50 preferably correspond to the shape of the regions 54, 56, 58 of the display device 12. The display device 12 may be a field emission display device developed by the FED Corporation of New York, or any other suitable device. Displays based on emissive technologies such as light emitting diodes, light emitting polymers, organic light emitting diodes, or electroluminescent displays may be used.

The light emitted from the display device 12 is collimated into a parallel beam by collimating optics 16 (FIG. 4A). The collimating optics 16 may include condenser lenses, mirrors, collimating lenses, and heat rejection filters as is well known by those skilled in the art. The parallel beam 71 is directed towards optical filters 30, 32, 34 which are each disposed at approximately a 45 degree angle with respect to a front surface of the light guide 52. The filters 30, 32, 34 are preferably dichroic mirrors (e.g., glass coated with multilayer dielectric and/or metallic coatings that reflect certain colors of light while allowing others to pass therethrough). Filter 30 is configured to reflect red light and allow green and blue light to pass therethrough. Similarly, dichroic filter 32 reflects green light and allows blue light to pass therethrough and filter 34 reflects blue light.

Figure 4B:
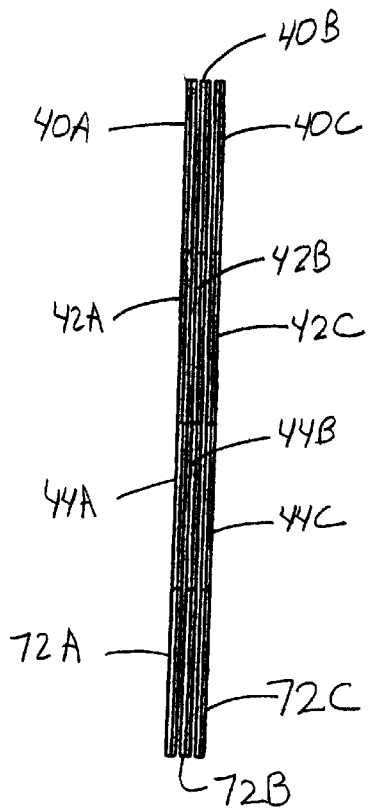
FIG. 4B is an enlarged side view of a front face of a light guide of the image generating system of FIG. 4A illustrating light directing devices and a beam deflector.
Figure 4C:
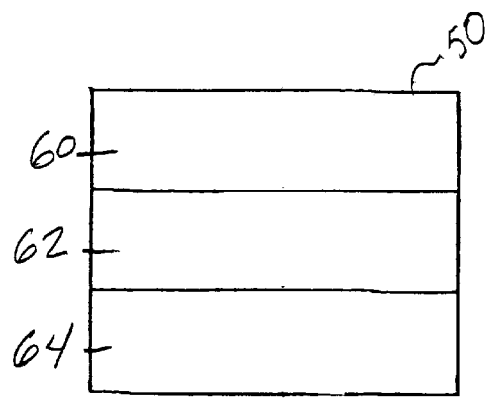
FIG. 4C is a front view of the intermediate image plane of FIG. 4A.

The geometry of the light guide 52 and refractive index of the light guide are configured such that light deflected by each of the light directing devices 40, 42, 44 is totally internally reflected by a rear face 68 of the guide. The light is then incident upon a common output window on the front face where a beam deflector 72 is disposed. The rear surface 68 of the light guide 52 comprises a reflective surface to reflect beams received from the light directing devices 40, 42, 42 onto the beam deflector 72. A mirror coating may be applied to the rear face 68 of the light guide 52 to maximize reflection of the red, green, and blue light beams. The beam deflector 72 is mounted on the front surface of the light guide 52 and laterally spaced below the light directing elements 40, 42, 44. The beam deflector 72 directs light to the image plane 50 (FIGS. 4A and 4C).

The light guide 52 may be replaced with a mirror with an air gap separating the light directing devices 40, 42, 44 and the mirror. However, the light guide 52 is preferred because it allows the use of extreme beam deviation angles without the reflection losses that would result from the use of a mirror at high incidence angles. The light guide 52 is normally based on the principle of total internal reflection due to the beam angles at the back surface of the light guide exceeding the glass/air critical angle.

The light directing devices 40, 42, 42 are mounted on a front surface of a transparent (e.g., glass) plate. Each light directing device 40, 42, 42 includes a stack of three holographic diffraction elements 40A, 40B, 40C, 42A, 42B, 42C, 44A, 44B, 44C, respectively (FIGS. 4A and 4B). The holographic elements are preferably positioned such that front surfaces of one of the elements of each stack are generally in the same plane and aligned vertically adjacent to one another. The holographic elements are each switchable between an active (diffracting) state and a passive (non-diffracting) state. It is to be understood that in the passive state (non-diffracting state), the incoming light may still be slightly diffracted, however, the light is not substantially altered. Switching of the holographic elements is controlled by controller 22 which operates to switch each of the elements between their active and passive states such that the light guide 52 produces red, green, and blue image components directed at regions 60, 62, 64 of the image plane 50 sequentially in a rapid cycle. The controller 22 is synchronized with the display controller 14 so that the red image is directed from the light guide 52 towards the upper region 60 of the image plane 50 when the red region 54 of the display device 12 displays the upper portion of the image, the green image is directed from the light guide towards the middle portion 62 of the image plane when the green region 56 displays the middle portion of the image, and the blue image is directed towards the lower portion 64 of the image plane when the lower portion of the image is displayed by the blue regions 58, as shown in FIG. 1A and 1B, for example.

The dichroic filters 30, 32, 34 and light directing devices 40, 42, 44 create three separate optical paths, red, green, and blue, respectively. For example, filter 30 reflects a red beam 74 from the light 76 incident thereon and directs this beam to the light directing device 40, which diffracts the beam and directs it towards the reflective rear surface 68 of the light guide 52 where it is reflected onto the beam deflector 72. The red beam 74 is then deflected from the beam deflector 72 and exits the light guide 52 at an angle approximately 180 degrees from the direction that the red beam entered the light guide and is directed to the image plane 50. The green component of the image passes through filter 30 and is reflected at an angle of 45 degrees from filter 32 onto the light directing device 42. The green beam 76 is diffracted so that it is incident on the rear face 68 of the light guide 52 and totally internally reflected thereby. The green beam 76 is then reflected onto the beam deflector 72 which deflects the beam towards the image plane 50. The blue light beam 78 passes through filters 30 and 32, and is reflected by filter 34 onto light directing device 44 which diffracts the blue beam onto the rear face 68 of the light guide 52. The blue light 78 is then reflected onto the beam deflector 72 which directs the beam towards the image plane 50.

The spectral bandwidth profiles of the red, green, and blue output beams 74, 76, 78 are preferably determined by the characteristics of the respective dichroic filters 30, 32, 34, so that the holographic elements are used only for beam directing. The diffraction efficiency spectral bandwidth of each holographic diffraction element is usually greater than the bandwidth of the respective filters 30, 32, 34.

Figure 5:
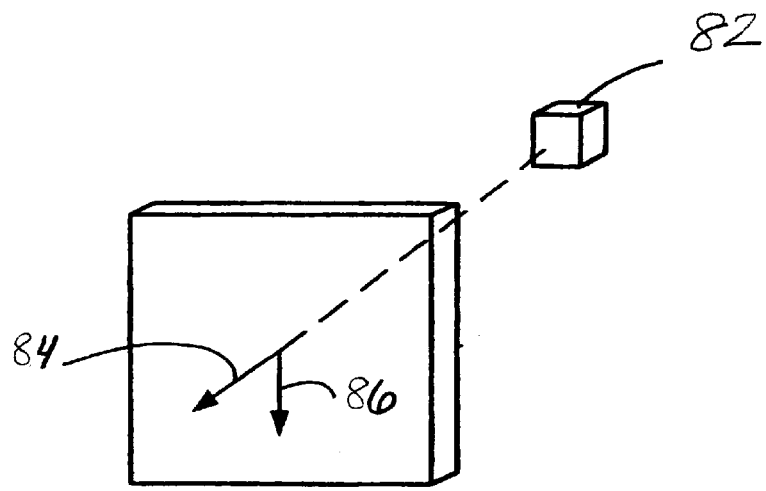
FIG. 5 is a perspective of a holographic optical element and light source for use with the image generating system of FIG. 1A.
Figure 6:
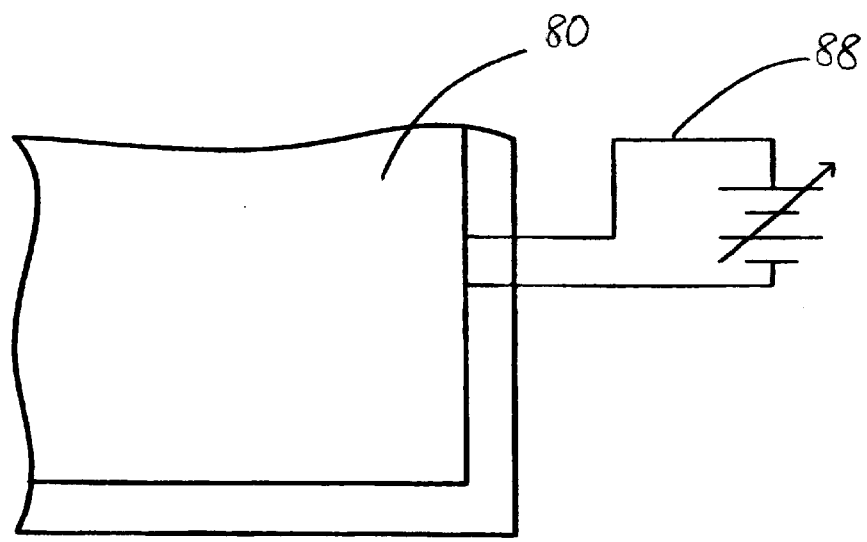
FIG. 6 is a partial front view of the holographic optical element of FIG. 5 illustrating an electrode and electric circuit of the holographic optical element.

The holographic optical elements 40A, 40B, 40C, 42A, 42B, 42C, 44A, 44B, 44C each include a hologram interposed between two electrodes 80 (FIGS. 5 and 6). The hologram may be a Bragg (thick or volume) hologram or RamanNath (thin) hologram. Raman-Nath holograms are thinner and require less voltage to switch light between various modes of the hologram, however, Raman-Nath holograms are not as efficient as Bragg holograms. The Bragg holograms provide high diffraction efficiencies for incident beams with wavelengths close to the theoretical wavelength satisfying the Bragg diffraction condition and within a few degrees of the theoretical angle which also satisfies the Bragg diffraction condition.

The hologram is used to control transmitted light beams based on the principles of diffraction. The hologram selectively directs an incoming light beam from light source 82 either towards or away from a viewer and selectively diffracts light at certain wavelengths into different modes in response to a voltage applied to the electrodes 80. Light passing through the hologram in the same direction as the light is received from the light source 82 is referred to as the zeroth (0th) order mode 84 (FIG. 3). When no voltage is applied to the electrodes 80, liquid crystal droplets within the holographic optical element are oriented such that the hologram is present in the element and light is diffracted from the zeroth order mode to a first (1st) order mode 86 of the hologram. When a voltage is applied to the holographic optical element, the liquid crystal droplets become realigned effectively erasing the hologram, and the incoming light passes through the holographic optical element in the zeroth order mode 84.

It is to be understood that the holographic optical elements 40A, 40B, 40C, 42A, 42B, 42C, 44A, 44B, 44C may also be reflective rather than transmissive as shown in FIG. 5 and described above. In the case of a reflective holographic optical element, the arrangement of the holographic devices and beam deflector 72 within the light guide 52 would be modified to utilize reflective properties of the hologram rather than the transmissive properties described herein.

The light that passes through the hologram is diffracted by interference fringes recorded in the hologram. Depending on the recording, the hologram is able to perform various optical functions which are associated with traditional optical elements, such as lenses and prisms, as well as more sophisticated optical operations. The hologram may be configured to perform operations such as deflection, focusing, or color filtering of the light, for example.

The holograms are preferably recorded in a photopolymer/liquid crystal composite material (emulsion) such as a holographic photopolymeric film which has been combined with liquid crystal, for example. The presence of the liquid crystal allows the hologram to exhibit optical characteristics which are dependent on an applied electrical field. The photopolymeric film may be composed of a polymerizable monomer having dipentaerythritol hydroxypentacrylate, as described in PCT Publication, Application Ser. No. PCT/US97/12577, by Sutherland et al, which is incorporated herein by reference. The liquid crystal may be suffused into the pores of the photopolymeric film and may include a surfactant.

The diffractive properties of the holographic optical elements depend primarily on the recorded holographic fringes in the photopolymeric film. The interference fringes may be created by applying beams of light to the photopolymeric film. Alternatively, the interference fringes may be artificially created by using highly accurate laser writing devices or other replication techniques, as is well known by those skilled in the art. The holographic fringes may be recorded in the photopolymeric film either prior to or after the photopolymeric film is combined with the liquid crystal. In the preferred embodiment, the photopolymeric material is combined with the liquid crystal prior to the recording. In this preferred embodiment, the liquid crystal and the polymer material are pre-mixed and the phase separation takes place during the recording of the hologram, such that the holographic fringes become populated with a high concentration of liquid crystal droplets. This process can be regarded as a "dry" process, which is advantageous in terms of mass production of the switchable holographic optical elements.

The electrodes (electrode layers) 80 are positioned on opposite sides of the emulsion and are preferably transparent so that they do not interfere with light passing through the hologram (FIG. 6). The electrodes 80 may be formed from a vapor deposition of Indium Tin Oxide (ITO) which typically has a transmission efficiency of greater than 80%, or any other suitable substantially transparent conducting material. An anti-reflection coating (not shown) may be applied to selected surfaces of the switchable holographic optical element, including surfaces of the ITO and the electrically nonconductive layers, to improve the overall transmissive efficiency of the optical element and to reduce stray light. The electrodes 80 are connected to an electric circuit 88 operable to apply a voltage to the electrodes, to generate an electric field (FIG. 6). Initially, with no voltage applied to the electrodes 80, the hologram is in the diffractive (active) state and the holographic optical element diffracts propagating light in a predefined manner. When an electrical field is generated in the hologram by applying a voltage to the electrodes 80 of the holographic optical element the operating state of the hologram switches from the diffractive state to the passive state and the holographic optical element does not optically alter the propagating light. It is to be understood that the electrodes may be different than described herein without departing from the scope of the invention. For example, a plurality of smaller electrodes may be used rather than two large electrodes which substantially cover surfaces of the holograms.

Figure 7:
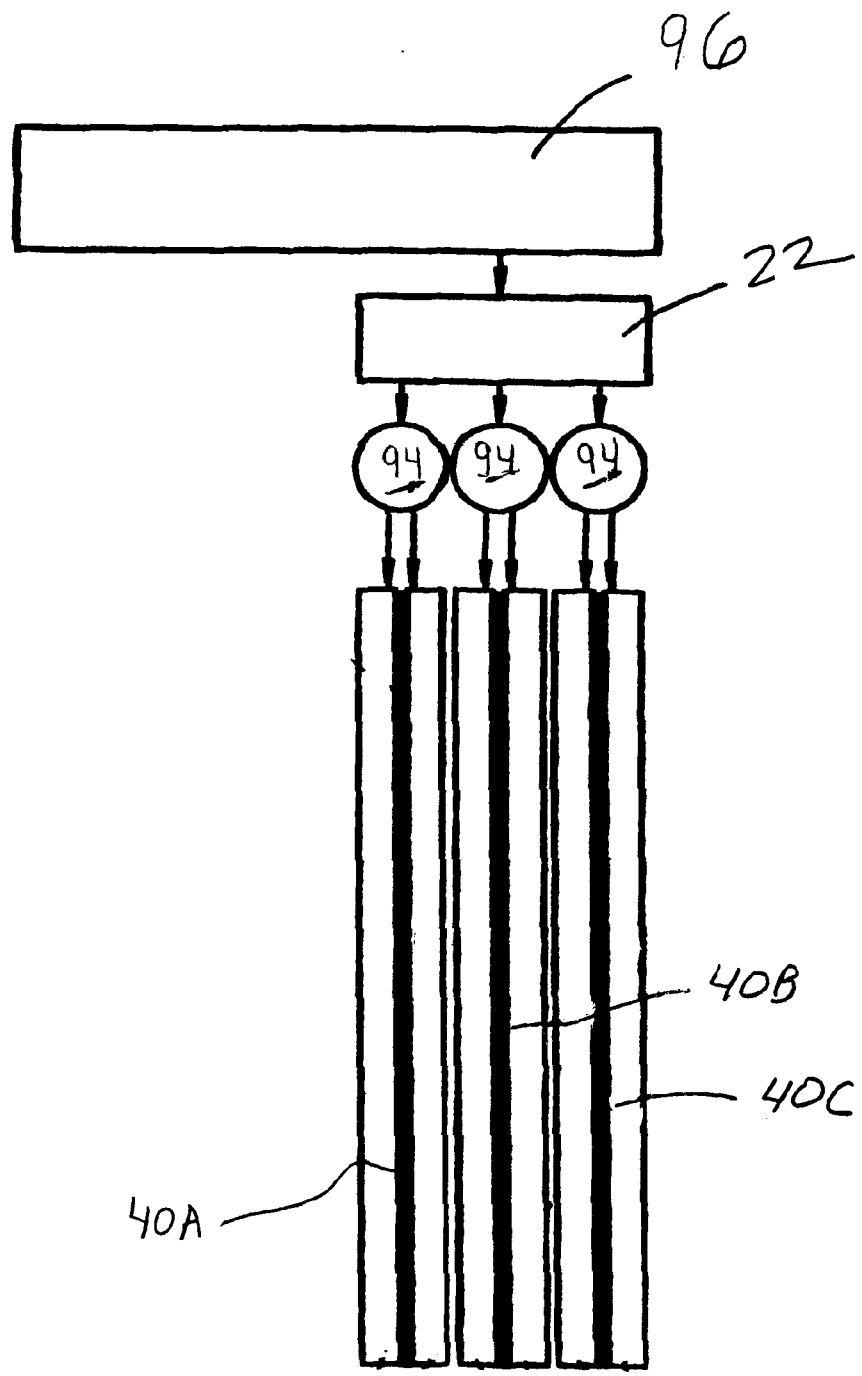
FIG. 7 is a schematic of a holographic device having three holographic optical elements and a control circuit.

Each holographic optical element is holographically configured such that only a particular monochromatic light is diffracted by the hologram. The red optical elements 40A, 40B, 40C each have a hologram which is optimized to diffract red light, the green optical elements 42A, 42B, 42C each have a hologram which is optimized to diffract green light, and the blue optical elements 44A, 44B, 44C each have a hologram which is optimized to diffract blue light. The light directing controller 22 drives switching circuitry 94 associated with the electrodes 80 on each of the optical elements to apply a voltage to the electrodes (FIGS. 6 and 7). The electrodes 80 are individually coupled to the light directing controller 22 through a voltage controller 96 which selectively provides an excitation signal to the electrodes 80 of a selected holographic optical element, switching the hologram to the passive state. The voltage controller 96 also determines the specific voltage level to be applied to each electrode 80.

Preferably, only one pair of the electrodes 80 associated with each one of the three holographic optical elements (40A, 40B, 40C) (42A, 42B, 42C) (44A, 44B, 44C) is energized at one time. In order to display a color image, the voltage controller 96 operates to sequentially display three portions of monochromatic images. The electrodes 80 attached to each of the holograms are sequentially enabled such that a selected amount of red, green, and blue light is directed towards the viewer. For example, when an upper portion of an image is projected from the red region 54 of the display device 12, the voltage controller 96 switches the middle and lower directing holograms 40B, 40C to their passive state by applying voltages to their respective electrodes 80. The supplied voltages to the electrodes 80 of the holograms 40B, 40C create a potential difference between the electrodes, thereby generating an electrical field within the holograms. The presence of the generated electrical field switches the optical characteristic of the holograms 40B, 40C to the passive state. With the holograms 40B, 40C in the passive state and the hologram 40A in the diffractive state, only the upper directing hologram 40A optically diffracts the projected red image. Thus, the upper portion of the red image is directed by hologram 40A to the upper region 60 of the image plane 50, as shown in FIGS. 1A and 1B. Similarly, the green hologram 42A will be activated to direct the green image to the middle area 62 of the image plane and the blue hologram 44A will be activated to direct the blue image to the lower area 64 of the image plane. The holograms 40B, 42B, and 44B are next changed to the diffractive state by deenergizing the corresponding electrodes 80 and the electrodes of the holograms 40A, 42A, 44A are energized to change the holograms to the passive state. The holograms 40C, 42C, and 44C are then changed to the diffractive state by deenergizing their electrodes 80 and the electrodes of the holograms 40B, 42B, and 44B are energized to change the holograms to the passive state.

The elements 40A, 42A, 44A are preferably arranged to be activated simultaneously and can be fabricated as a single unit which is switchable into and out of the diffracting state. The same applies to elements 40B, 42B, 44B and 40C, 42C, 44C.

The holograms are sequentially enabled with a refresh rate (e.g., less than 150 microseconds) which is faster than the response time of a human eye so that a color image will be created in the viewer's eye due to the integration of the red, green, and blue monochrome images created from each of the red, green, and blue holograms. The red, green, and blue holographic elements may be cycled on and off in any order.

It is to be understood that the holographic diffraction elements may be different than described herein without departing from the scope of the invention. For example, the light directing system 20 may include additional holographic elements that perform additional optical functions.

As described above, the light diffracted by the holographic optical elements is reflected onto the beam deflector 72 which deflects the red, green, and blue image in a common direction towards the image plane 50 (FIG. 4A). The beam deflector 72 preferably comprises a holographic diffraction device having three holographic optical elements 72A, 72B, 72C, each optimized for red, green, and blue light, respectively (FIGS. 4A and 4B). The elements may be switchable as previously described, however, since the red, green, and blue beams 74, 76, 78 are incident on the beam deflector 72 from different angles, and the holograms in the deflector are relatively insensitive to light of a given wavelength incident at a non-Bragg angle, the holographic diffraction elements of the beam deflector do not need to be switchable. Further, since the angular separation between the red, green, and blue beams 74, 76, 78 is relatively large (i.e., larger than the angular bandwidth of the Bragg holograms), the Bragg angular and wavelength selectivity will be sufficient to ensure that there is no appreciable cross-talk between the red, green, and blue wavelengths.

In addition to focusing the light onto the image plane 50, the beam deflector 72 may also compensate for chromatic dispersion introduced by the holographic diffraction elements of the light directing system 20 and correct dispersion, chromatic, and geometric aberrations created due to the holographic diffraction elements operating off-axis and over large spectral bandwidths. More particularly, the characteristics of the holographic optical elements and the red, green, and blue holograms of the beam deflector 72 are preferably optimized so that the dispersion introduced by the holographic optical elements of the light directing system 20 are compensated for by the beam deflector holograms.

The light may be directed by the beam deflector 72 onto the intermediate image plane and additional optics (not shown) may be used to project the image to an observer. However, it is to be understood that the image plane 50 may also be the actual image viewed by the observer. It is preferred that the intermediate image is used to form a projected image (e.g., on a screen) or an eye piece is used to form a virtual image (which could be at infinity) so that the projection or eye piece can be used to correct aberrations and color dispersion. The image plane 50 may also be a curved image surface. In the case of an intermediate image, a curved surface is advantageous for correcting aberrations and geometric distortions. Additional optical components (not shown) may also be provided at the input or output of the light guide 52 to generate desired optical characteristics in the red, green, and blue output beams.

Figure 8:
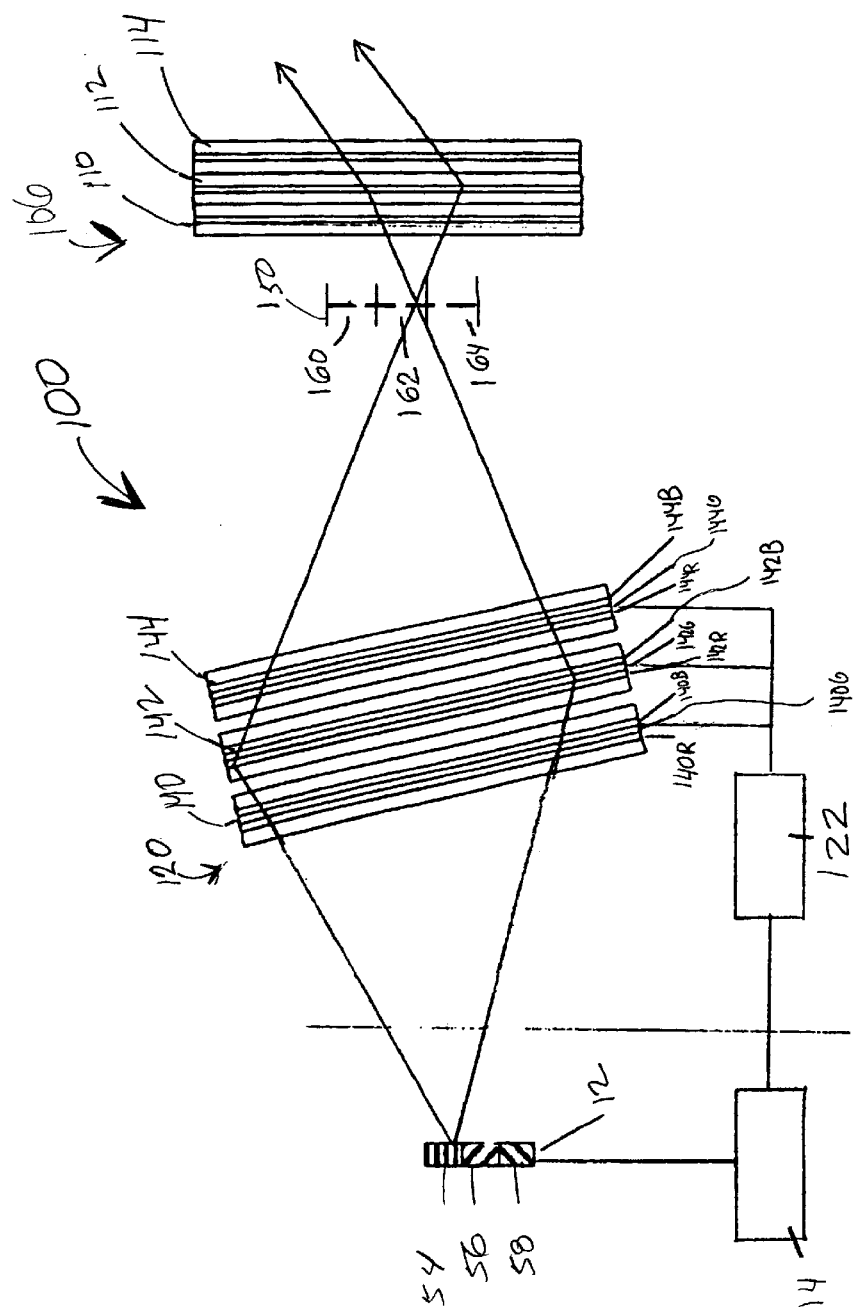
FIG. 8 is a side view of a second embodiment of an image generating system of the present invention.

A second embodiment of the image generating system is shown in FIG. 8 and generally indicated at 100. The system 100 includes the display device 12 having display regions 54, 56, 58 which are controlled by the display controller 14, as previously described. Light emitted from the display device 12 is directed towards upper, middle, and lower areas 160, 162, 164 of the image plane 150 by light directing system 120 controlled by light directing controller 122. The light directing system 120 includes light directing devices 140, 142, 144 disposed in sequence along the optical path between the display device 12 and the image plane 150. Each of the light directing devices 140, 142, 144 includes a stack of three holographic diffraction elements 140R, 140G, 140B, 142R, 142G, 142B, 144R, 144G, 144B, respectively, which are configured to act on red, green, and blue wavelengths. The holographic diffraction elements are switchable by the light directing controller 122 between their active (diffracting) and passive (nondiffracting) states.

In operation, the red region 54 of the display device 12 first displays an upper third portion of the image, the green region 56 displays a middle portion of the image and blue region 58 displays a lower portion of the image. The holographic diffraction device 140 is activated by the light directing controller 122 and the element 140R directs light from the red region 54 of the display device 12 to the upper area 160 of the image plane 150 and the elements 140G and 140B direct light from the green and blue regions 56, 58 to the middle and lower portions 162, 164, respectively, of the image plane.

The red region 54 of the display device 12 next displays a middle portion of the image, the green region 56 displays a lower portion of the image, and blue region 58 displays an upper portion of the image. The holographic diffraction device 142 is activated and device 140 is returned to its passive state. Element 142R now directs light from the red region 54 of the display device 12 to the middle area 162 of the image plane 150 and the elements 142G and 142B direct light from the green and blue regions 56, 58 to the lower area 164 and upper area 160, respectively, of the image plane.

The red region 54 of the display device then displays a lower portion of the image, green region 56 displays an upper portion of the image, and blue region 58 displays a middle part of the image. Holographic diffraction device 144 is changed to its active state while device 142 is switched to its passive state. Holographic element 144R directs light from the red region 54 of the display device 12 to the lower area 164 of the image plane 150, element 144G directs light from the green region 56 of the display to the upper portion 160 of the image plane, and element 144B directs light from the blue region 58 to the middle area 162 of the image plane. As described for the previous embodiment, each of the regions 160, 162, 164 of the image plane 150 receive in succession red, green, and blue components of the relevant part of the image. Switching is performed cyclically and very rapidly so then an observer perceives what is effectively a fall color image.

The image formed at image plane 150 in the second embodiment 100 is used as an intermediate image and is subsequently processed by optical device 106 prior to being viewed by an observer. In addition to collimating light from the intermediate image, the device 106 acts to correct for chromatic dispersion introduced by the holographic diffraction elements of the devices 140, 142, 144. The optical device 106 includes a stack of three holographic diffraction elements 110, 112, 114 which are operable to act upon red, green and blue wavelengths, respectively. These elements may be switchable as described above, but are preferably not switchable. The holographic diffraction elements 110, 112, 114 are shown to operate on transmission principles, however, the elements may also be arranged to be operate as reflective elements.

The transmission holograms described above are sensitive to the polarization state of incident light and exhibit maximum diffraction efficiency for p-polarized light, with the response to s-polarized light being around 1% for that of p-polarized light. In order to make use of the full output of the light source the system 10, 100 may include elements which make use of both the p-polarized light and s-polarized light, such as disclosed in U.S. patent application Ser. No. 09/478,150, filed Jan. 5, 2000, which is incorporated herein by reference in its entirety. For example, pairs of holographic diffraction elements may be used with one element in the pair acting on the p-polarized component and the other acting on the s-polarized components. This may be achieved either by interposing a polarization rotator between the elements in the pair or by arranging for the interference fringes in the elements of each pair to be mutually crossed. If reflection holograms are used, these additional provisions are not required since reflection holograms only start to become polarization sensitive at large angles of incidence, typically much greater than 45 degrees.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A system for generating an image, comprising:
    a display device comprising a plurality of display regions, each region configured for displaying a color component of said image;
    a display controller coupled to the display device and operable to activate said regions of the display device to display different portions of said image;
    a plurality of light directing devices positioned to receive light from said regions of the display device and direct light towards an image plane; and
    a light directing controller coupled to the light directing devices to direct light received thereby to different areas of said image plane, the areas of said image plane generally corresponding to the different portions of said image displayed by said regions of the display device;
    wherein the display controller and the light directing controller are coupled together such that the light directing devices direct light to the area of the image plane corresponding to the portion of said image displayed by the region of the display device; and
    a beam deflector operable to receive and deflect the light beams in a common direction, wherein the beam deflector is configured to substantially compensate for chromatic dispersion created by the light directing devices.

2. The system of claim 1 wherein the light directing devices each comprise a plurality of holographic optical elements switchable between an active state wherein light incident on the element is diffracted and a passive state wherein light incident on the element is transmitted without substantial alteration.

3. The system of claim 2 further comprising a plurality of optical filters each configured to reflect light having a wavelength band corresponding to one of the color components onto at least one holographic optical element.

4. The system of claim 3 wherein each of the holographic optical elements are disposed on a common optical path with one of said plurality of filters.

5. The system of claim 3 wherein the optical filters are dichroic filters.

6. The system of claim 1 wherein said plurality of display regions comprises three regions configured to display red, green, and blue image components.

7. The system of claim 6 wherein said plurality of regions form horizontal bands, each band covering approximately one-third of a display area of the display device.

8. The system of claim 7 wherein said areas of said image plane comprises three horizontal bands corresponding generally in shape to the horizontal bands of the display device.

9. The system of claim 8 wherein each of the light directing devices comprises holographic optical elements configured to diffract light of a wavelength corresponding to one of said color components.

10. The system of claim 9 wherein each of the holographic optical elements is configured to direct light to one of said areas of said image plane.

11. The system of claim 1 wherein each of the light directing devices comprises a stack of holographic optical elements switchable between an active state wherein light incident on the element is diffracted and a passive state wherein light incident on the element is transmitted without substantial alteration.

12. The system of claim 11 wherein each of the holographic optical elements within the stack is configured to direct light towards a different of said areas of said image plane.

13. The system of claim 12 wherein each of the holographic optical elements within the stack is configured to diffract light of the same color component.

14. The system of claim 11 wherein one of the holographic optical elements from each of the stacks is electronically coupled with one of the holographic optical elements from the other stacks.

15. The system of claim 14 wherein each of the holographic optical elements within the stack is configured to diffract a different color component of the image.

16. The system of claim 11 wherein the light directing controller is operable to simultaneously switch one of the holographic optical elements from each of said stacks to their active states so that the different portions of said image are directed to the different areas of said image plane.

17. The system of claim 11 wherein the light directing controller is operable to sequentially switch each of the holographic optical elements within said stack from the passive state to the active state while switching the other holographic optical elements within said stack to their passive state.

18. The system of claim 11 wherein the holographic optical elements within each of said stacks are aligned such that a front face of one of the elements within each of the stacks is located generally in a common plane with front faces of one of the elements of the other stacks.

19. The system of claim 11 wherein the holographic optical elements are stacked together such that at least one of a front surface and a back surface of each of the elements is adjacent another one of the elements.

20. The system of claim 11 wherein each of the holographic optical elements comprises a hologram interposed between two electrode layers operable to apply an electrical field to the hologram.

21. The system of claim 20 wherein the hologram is formed from a polymer and liquid crystal material.

22. The system of claim 11 wherein said stack of holographic optical elements comprises three holographic optical elements.

23. The system of claim 22 wherein the three holographic optical elements each have a hologram recorded therein which is optimized to diffract red, green, or blue light.

24. The system of claim 23 wherein each of the holograms is interposed between two electrode layers operable to apply an electrical field to the hologram to diffract the red, green, or blue light.

25. The system of claim 24 wherein the light directing controller is operable to sequentially supply voltage to and remove voltage from the electrode layers of each of the holographic optical elements to create a sequence of monochrome images which are combined to form a color image.

26. The system of claim 1 wherein the beam deflector comprises a plurality of holographic optical elements.

27. The system of claim 26 wherein said plurality of holographic optical elements comprises three holographic optical elements each having a hologram recorded therein that is optimized to diffract red, green, or blue light.

28. The system of claim 1 wherein said plurality of display regions each comprise an array of light emitting diodes operable to display light having a wavelength corresponding to one of the color components of the image.

29. The system of claim 1 wherein the optical device comprises at least one holographic optical element switchable between an active state wherein light incident on the element is diffracted and a passive state wherein light incident on the element is transmitted without substantial alteration.

30. The system of claim 1 wherein said image plane is disposed for viewing a final image by a user of the system.

31. A system for creating a full polychromatic image from a plurality of monochromatic images containing a portion of said full image, the system comprising:

a plurality of light directing devices each comprising a plurality of holographic optical elements switchable between an active state wherein light incident on the element is diffracted and a passive state wherein light incident on the element is transmitted without substantial alteration, the holographic optical elements operable to receive the portion of the full image and direct it to an area of an image plane corresponding generally to the portion of the image received; and a beam deflector operable to receive the light beams from the light directing devices and deflect the light beams in a common direction, wherein the beam deflector is configured to substantially compensate for chromatic dispersion created by the light directing devices.

32. The system of claim 31 further comprising a light directing controller operable to switch the holographic optical elements between their active and passive states to create a sequence of the monochromatic images which are combined to form a full color image.

33. The system of claim 31 further comprising a plurality of optical filters configured to reflect a color component onto at least one of the holographic optical elements.

34. The system of claim 33 wherein each of the holographic optical elements are disposed on a common optical path with one of said plurality of filters.

35. The system of claim 31 wherein said plurality of regions comprises three regions configured to display red, green, and blue image components.

36. The system of claim 31 wherein the beam deflector comprises a plurality of holographic optical elements.

37. The system of claim 31 wherein said image plane is an intermediate image plane and wherein the system further comprises an optical device operable to process said intermediate image for viewing by a user of the system.

38. The system of claim 37 wherein the optical device substantially corrects for chromatic dispersion created by the light directing devices.

39. The system of claim 38 wherein the optical device comprises at least one holographic optical element switchable between an active state wherein light incident on the element is diffracted and a passive state wherein light incident on the element is transmitted without substantial alteration.

40. The system of claim 39 wherein said image plane is disposed for viewing a final image by a user of the system.

41. A system for generating an image, comprising:

a display device comprising a plurality of display regions, each region configured for displaying a color component of said image;

a display controller coupled to the display device and operable to activate said regions of the display device to display different portions of said image;

a plurality of light directing devices positioned to receive light from said regions of the display device and direct light towards an image plane, wherein said image plane is an intermediate image plane; and a light directing controller coupled to the light directing devices to direct light received thereby to different areas of said image plane, the areas of said image plane generally corresponding to the different portions of said image displayed by said regions of the display device;

wherein the display controller and the light directing controller are coupled together such that the light directing devices direct light to the area of the image plane corresponding to the portion of said image displayed by the region of the display device; and an optical device operable to process said intermediate image for viewing by a user of the system, wherein the optical device substantially corrects for chromatic dispersion created by the light directing devices.

42. A method for generating an image, comprising:

displaying a color component of an image on a plurality of display regions of a display device;

activating said regions of the display device to display different portions of said image;

receiving light by a plurality of light directing devices, wherein the light is received from said regions of the display device and direct light towards an image plane;

directing light received to different areas of said image plane, the areas of said image plane generally corresponding to the different portions of said image displayed by said regions of the display device;

wherein light is directed to the area of the image plane corresponding to the portion of said image displayed by the region of the display device; and receiving and deflecting the light beams in a common direction, wherein chromatic dispersion created by the light directing devices is substantially compensated.

* * * * *